United States Patent
Sterzbach et al.

(10) Patent No.: US 10,599,631 B2
(45) Date of Patent: Mar. 24, 2020

(54) LOGGING SYSTEM AND METHOD FOR LOGGING (71) Applicant: Rohde & Schwarz GmbH & Co. KG, München (DE)

(72) Inventors: Bernhard Sterzbach, München (DE); Christoph Nufer, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 594 days.

(21) Appl. No.: 14/984,001

(22) Filed: Dec. 30, 2015

(65) Prior Publication Data

US 2017/0147622 A1 May 25, 2017

Related U.S. Application Data (63) Continuation-in-part of application No. 14/949,789, filed on Nov. 23, 2015, now abandoned.

(51) Int. Cl.
*G06F 16/23* (2019.01)
*G06F 16/27* (2019.01)
*G06F 16/68* (2019.01)
*G06F 16/78* (2019.01)
*G11B 27/36* (2006.01)
*H04N 17/00* (2006.01)
(Continued)

(52) U.S. Cl.
CPC ...... *G06F 16/2358* (2019.01); *G06F 16/2365* (2019.01); *G06F 16/275* (2019.01); *G06F 16/686* (2019.01); *G06F 16/7867* (2019.01); *G06K 9/00718* (2013.01); *G11B 27/10* (2013.01); *G11B 27/3045* (2013.01); *G11B 27/34* (2013.01); *G11B 27/36* (2013.01);

*H04N 5/91* (2013.01); *H04N 17/004* (2013.01); *H04N 17/04* (2013.01); *H04W 4/021* (2013.01); *G06K 2009/00738* (2013.01)

(58) Field of Classification Search
CPC ...................................................... G06F 16/275
USPC .......................................................... 386/241
See application file for complete search history.

(56) References Cited

U.S. PATENT DOCUMENTS 5,818,520 A 10/1998 Janko et al.
6,141,042 A 10/2000 Martinelli et al.
(Continued)

FOREIGN PATENT DOCUMENTS

EP 0 789 497 A2 8/1997
EP 0 888 019 A1 12/1998
(Continued)

OTHER PUBLICATIONS

Notice of Preliminary Rejection, and brief summary translation, from counterpart Korean Application No. 10-2016-0150165, dated Feb. 20, 2018, 10 pp.

(Continued)

*Primary Examiner* — William C Vaughn, Jr.
*Assistant Examiner* — Daniel T Tekle
(74) *Attorney, Agent, or Firm* — Shumaker & Sieffert, P.A.

(57) ABSTRACT

Systems and methods are provided for logging tests of electronic devices, which are performed on the electronic devices by a measurement and/or testing device. While logging the test messaged and any other messages generated by the measurement and/or testing device during the test, a video is recorded of the respective electronic device and timely synchronized with the log of the test.

21 Claims, 4 Drawing Sheets (51) Int. Cl.
*H04N 17/04* (2006.01)
*G11B 27/10* (2006.01)
*G11B 27/30* (2006.01)
*G06K 9/00* (2006.01)
*G11B 27/34* (2006.01)
*H04N 5/91* (2006.01)
*H04W 4/021* (2018.01)

(56) References Cited

U.S. PATENT DOCUMENTS

| | | | |
|---|---|---|---|
| 7,937,723 B2 | 5/2011 | Weissmuller, Jr. et al. | |
| 9,401,150 B1 | 7/2016 | Dorenbosch | |
| 2007/0040035 A1 | 2/2007 | Kotlarsky et al. | |
| 2007/0223874 A1 | 9/2007 | Hentschel | |
| 2008/0256394 A1 | 10/2008 | Rashevsky et al. | |
| 2009/0058986 A1 | 3/2009 | Beers et al. | |
| 2011/0096836 A1 | 4/2011 | Einarsson | |
| 2011/0263243 A1 | 10/2011 | Topaltzas et al. | |
| 2012/0140081 A1* | 6/2012 | Clements | H04N 17/004 348/181 |
| 2013/0209070 A1 | 8/2013 | Rivas-mcoud et al. | |
| 2013/0216202 A1* | 8/2013 | Palakshamurthy | H04N 9/8233 386/241 |
| 2013/0286860 A1 | 10/2013 | Dorenbosch et al. | |
| 2013/0343467 A1 | 12/2013 | Sogani et al. | |
| 2014/0078867 A1 | 3/2014 | Nakamura et al. | |
| 2014/0355947 A1* | 12/2014 | Slamecka | H04N 5/91 386/201 |
| 2015/0015573 A1* | 1/2015 | Burtzlaff | G09G 3/003 345/419 |
| 2015/0062353 A1 | 3/2015 | Dalal et al. | |
| 2015/0138307 A1 | 5/2015 | Karimi-Cherkandi et al. | |
| 2015/0189344 A1 | 7/2015 | Amidei et al. | |
| 2015/0341646 A1 | 11/2015 | Sze et al. | |
| 2016/0078793 A1 | 3/2016 | Aimonen et al. | |
| 2016/0210716 A1 | 7/2016 | Ghosh et al. | |
| 2016/0225131 A1 | 8/2016 | Babbar | |
| 2016/0301924 A1 | 10/2016 | Tay et al. | |
| 2017/0147622 A1 | 5/2017 | Sterzbach | |
| 2017/0150140 A1 | 5/2017 | Nufer | |
| 2017/0150142 A1 | 5/2017 | Aumer et al. | |

FOREIGN PATENT DOCUMENTS

| | | |
|---|---|---|
| EP | 1 377 080 A1 | 1/2004 |
| EP | 2 239 952 A1 | 10/2010 |
| JP | 2008206042 A | 9/2008 |
| KR | 100618319 B1 | 8/2006 |
| KR | 100727090 B1 | 6/2007 |
| KR | 20150019684 A | 2/2015 |
| WO | 2007061241 A1 | 5/2007 |
| WO | WO 2014/175823 A1 | 10/2014 |

OTHER PUBLICATIONS

Prosecution History from U.S. Appl. No. 14/949,789, dated from Oct. 21, 2016 through Nov. 2, 2017, 80 pp.
Final Office Action for U.S. Appl. No. 14/949,789 (dated Mar. 21, 2017).
Non-Final Office Action for U.S. Appl. No. 14/949,789 (dated Oct. 21, 2017).
Advisory Action for U.S. Appl. No. 14/949,789 (dated Aug. 15, 2017).
Notice of Allowance from U.S. Appl. No. 15/054,074, dated Jun. 8, 2018, 12 pp.

* cited by examiner

LOGGING SYSTEM AND METHOD FOR LOGGING

PRIORITY CLAIM

This application is a continuation-in-part of U.S. patent application Ser. No. 14/949,789, filed Nov. 23, 2015, the disclosure of which is incorporated herein by reference in its entirety.

TECHNICAL FIELD

The invention relates to a logging system for logging tests of electronic devices by at least one measurement and/or testing device. Furthermore, the invention relates to a corresponding method.

BACKGROUND

Although applicable to any electronic system, the present invention will be described primarily in combination with smartphones.

Modern smartphones need to be tested in production e.g. for compliance with specific legislative regulations.

The testing of smartphones is therefore performed e.g. in an end of line test in the respective production line and can be a very complex process, where the respective smartphone is tested against different protocols and communication standards.

SUMMARY

A logging system for logging, i.e. protocolling, tests of electronic devices by at least one measurement and/or testing device, like e.g. an oscilloscope, a signal analyser, a wireless connectivity tester, power supplies or the like, comprises a first video recording unit, which records a video of the electronic device under test while the test is performed on the electronic device by the at least one measurement and/or testing device, a log memory, which stores a log of the tests performed by the at least one measurement and/or testing device on the electronic device, and a processor, which timely synchronizes the log of the tests with the video recorded by the first video recording unit and stores the log with the video in the log memory.

A method for logging tests of electronic devices by at least one measurement and/or testing device comprises recording a video of the electronic device under test while the test is performed on the electronic device by the at least one measurement and/or testing device, storing a log of the tests performed by the at least one measurement and/or testing device on the electronic device, timely synchronizing the log of the tests with the recorded video, and storing the log with the video in the log memory.

The log can e.g. comprise log and/or test messages, which are produced by the at least one measurement and/or testing device while the test is performed on the electronic device. Every single log or test message can e.g. be provided with a time stamp. At the same time the single frames of the recorded video can be provided with a time stamp.

The processor can then simply combine the log and/or test messages with the respective video frames.

Therefore, when reviewing the test log a user can not only read the single log and/or test messages but also see the reaction of the electronic device, e.g. flashing of optical indicators like diodes or changes on the screen of the electronic device. Such visual log content can provide valuable information e.g. to a test engineer.

Further embodiments of the present invention are subject of the further subclaims and of the following description, referring to the drawings.

In a possible embodiment, the logging system can comprise a display unit, which shows the log in a tabular form and for every log entry shows the respective video frame in the table or a link to the respective video frame. A tabular form allows easily parsing the test log. Further, if links are provided to the respective video frames, the table can be presented in a very compact format and single table rows can e.g. be expanded to show the respective video frame, if the user wants to see the video frame.

In a possible embodiment, the first video recording unit can be a camera of the electronic device, and at least one mirror can be positioned around the electronic device, such that the camera can record the content of a screen of the electronic device. If the camera of the electronic device itself is used, no separate hardware has to be provided.

In a possible embodiment, an application can be provided on the electronic device, which records a respective video together with specific time stamps. The time stamps later allow correlating or selecting the video with the log data.

In a possible embodiment, the first video recording unit can be the electronic device, which performs screen capturing of its' screen.

In a possible embodiment, the first video recording unit can be a camera, which is external to the electronic device. This allows testing any electronic device, even if the device does not have a camera.

In a possible embodiment, the first video recording unit can further record a video of the at least one measurement and/or testing device. This allows not only viewing a picture of the respective electronic device with the log data but also viewing pictures of the respective measurement and/or testing devices, which can also provide valuable information to e.g. a test engineer.

In a possible embodiment, the logging system can comprise a second video recording unit, which records a video of the at least one measurement and/or testing device. This allows more flexibly positioning the measurement and/or testing device(s) because the position of the first video recording unit does not influence the ability to record a video of the measurement and/or testing device.

In a possible embodiment, the logging system can comprise a testing chamber, wherein the first video recording unit can be provided on the outside of the testing chamber and can record a video of the interior of the testing chamber. A testing chamber can be needed to isolate the electronic device from external disturbances. Positioning the camera accordingly allows isolating the device under test and at the same time recording a video of the device while it is tested.

In a possible embodiment, the testing chamber can be an anechoic chamber and an opening hole is provided in an outer wall of the anechoic chamber, which is positioned between at least two reflection elements of the anechoic chamber. The opening can be a pinhole for a pinhole camera, like they are used e.g. in smartphones.

In a possible embodiment, the first video recording device can be positioned to record a video through the opening hole. The above allows testing the electronic device in an anechoic chamber and recording the video of the electronic device without destroying the anechoic effect of the chamber.

In a possible embodiment, the logging system can comprise an audio recording device, which records an audio stream of sounds that are emitted by the electric device and/or the measurement and/or testing device, while the electronic device is tested. With the audio recording device any audio feedback emitted by the electronic device can be recorded and attached to the respective log data or messages.

In a possible embodiment, the processor can timely synchronize the log of the tests with the respective sections of the recorded audio stream. The processor can e.g. provide links to the sections of the audio stream with single entries in the log. The links can then be activated by a user to listen to the recorded sounds.

In a possible embodiment, the logging system can comprise a satellite based positioning system, which can determine the position of the electronic device while the test is preformed.

In a possible embodiment, the processor can analyse the recorded video and/or recorded audio and marks predefined events, like e.g. an incoming call, an incoming message, the end of a call or the like, in the log based on the analysis. The processor can e.g. use pattern recognition methods for analysing the recorded video or audio.

In a possible embodiment the a measurement system can be used for measuring a change between a first video sequence having a first video quality and a second video sequence having a second video quality of a device under test, the method comprising a video signal source providing said first video sequence having said first video quality and said second video sequence having said second video quality, and detecting means for detecting identification means, like the unique marks explained above, which are different for said first video sequence and said second video sequence.

In a possible embodiment said identification means can be an optical or acoustical pattern. The identification means can be a bar code or a QR code for an optical pattern or a sound sequence for an acoustical pattern.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
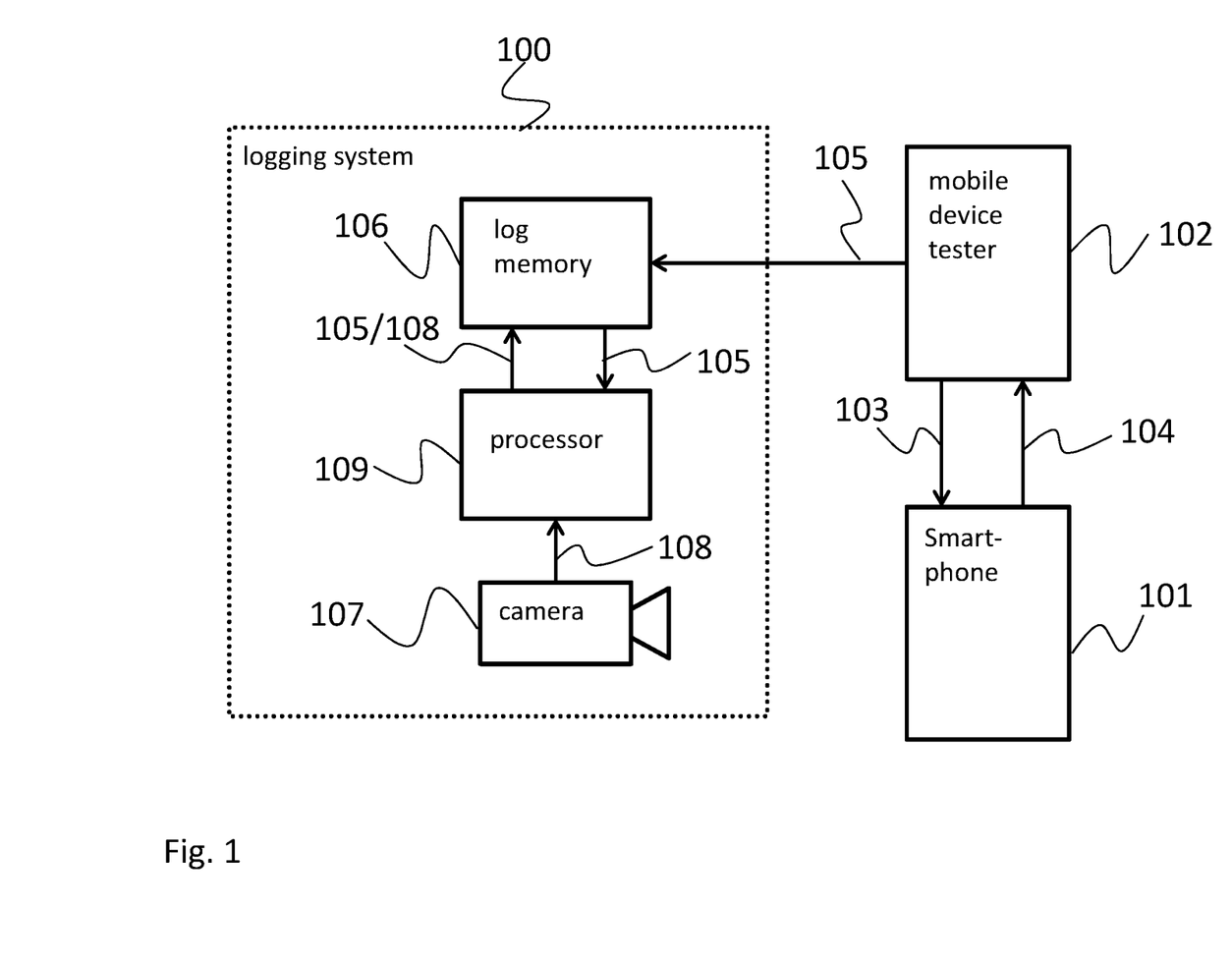
FIG. 1 shows a block diagram of an embodiment of a logging system according to an embodiment of the present invention.

FIG. 1 shows a block diagram of an embodiment of a logging system 100 according to an embodiment of the present invention.

In FIG. 1 a smartphone 101 is tested by a mobile device tester 102, e.g. for compliance with communication standards like GSM, UMTS or LTE or the like. During the test the mobile device tester 102 sends signals 103 to the smartphone 101 and receives response messages or signals 104 from the smartphone 101. Instead of the mobile device tester 102 any other test equipment can also be uses as the measurement and/or testing device as required by the specific application.

The mobile device tester 102 generates a log 105 and provides the log 105 to the logging system 100, where the log 105 is stored in a log memory 106. As an alternative the messages or signals 104 can be forwarded to the logging system 100, where the log is built up.

The logging system 100 further comprises a camera 107, which records a video of the smartphone 101, while the mobile device tester 102 performs the tests on the smartphone 102.

The camera 107 can be any type of camera 107, like a digital video camera or the like.

The camera 107 provides the recorded video 108 to the processor 109, which reads the log 105 from the log memory 106 and timely aligns the single log messages in the log 105 with the video 108. The processor 109 then stores the log 105 with the video 108 in the log memory 106.

It is also possible, that the camera 107 stores the video 108 directly in the log memory 106 and the processor 109 timely aligns the stored video 108 with the stored log 105 after the test has been conducted and terminated.

In FIG. 1 the camera 107 is external to the smartphone 101. But it is also possible to use the smartphones' built in camera to record the video 108 (see FIG. 2 for more details).

Figure 2:
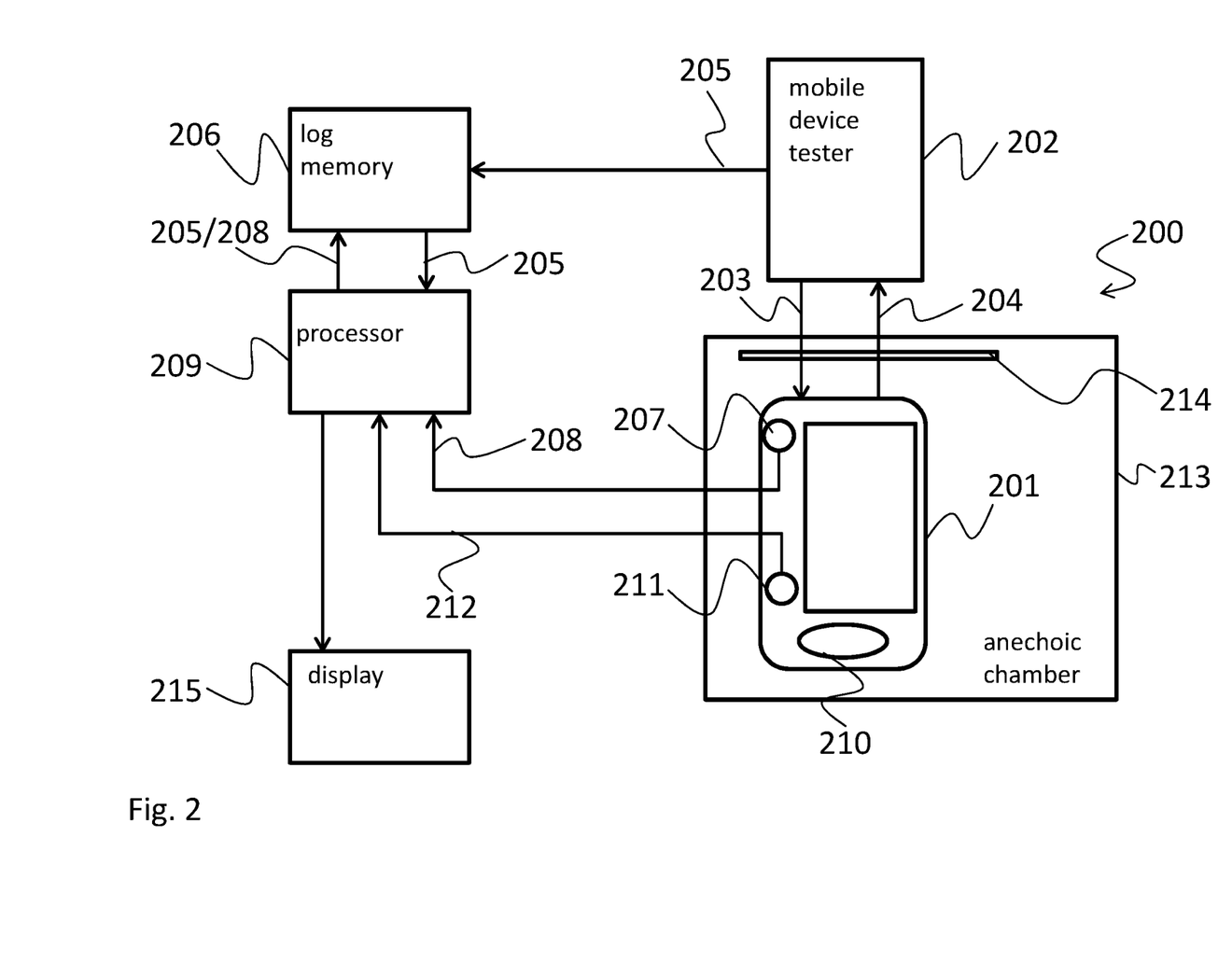
FIG. 2 shows a block diagram of another embodiment of a logging system according to an embodiment of the present invention.

FIG. 2 shows a block diagram of another embodiment of a logging system 200 according to an embodiment of the present invention.

As in FIG. 1 a mobile device tester 202 tests a smartphone 201, but in the embodiment of FIG. 2 the smartphone 201 is positioned inside an anechoic chamber 213. Furthermore, in FIG. 2 the smartphone camera 207 is used instead of a separate camera 107, as in FIG. 1. In order to allow the smartphone camera 207 to record the screen of the smartphone 201 a mirror 214 is placed such, that the camera 207 has the smartphone 208 or at least the screen and/or any diode of the smartphone 208 in view.

In addition to the embodiment of FIG. 1 in FIG. 2 the microphone 211 of the smartphone 201 is used to record any audio output, which the speaker 210 of the smartphone 201 produces during the test.

The recorded video 208 and the recorded audio 212 are together provided to the processor 209, which timely synchronizes and stores in the log memory 206 the video 208, the audio 212 and the log data 205.

In the smartphone 201 an application can be provided, which comprises the needed recording functions and any data transmission function, which is needed to transmit the video 208 and the audio 212 to the processor. The application can also comprise functions, which allow or support the synchronization of the video 208, the audio 212 and the log data 205. The application can e.g. provide time stamps in the video 208 and the audio 212 or provide the video 208 and the audio 212 to the processor 209 in an already synchronized fashion, e.g. as a single stream.

Further, a camera external to the anechoic chamber 213 can be used to record a video of the smartphone 201. Such a camera would be positioned at a pinhole in the casing of the anechoic chamber 213, to not interfere with the anechoic chambers' echo cancelling functions.

The processor 209 for processing the log data 205, the video 208 and the audio 212 can be at least in part a computer program, which is executed in a processor of a computer or any adequate test equipment. The processor 209 can also be implemented at least in part in a CPLD, FPAG, ASIC or the like. Further, the functions of the processor 209 can be separated into different entities. Some of the functions of the processor 209 can e.g. be included in the smartphone application or the mobile device tester 202.

While recording or after storing the video 208, the audio 212 and the log data 205 in the log memory 206, the processor 209 can display the log data 205 together with the video 208 and the audio 212 via a display 215 for a user to review the test results.

Figure 3:
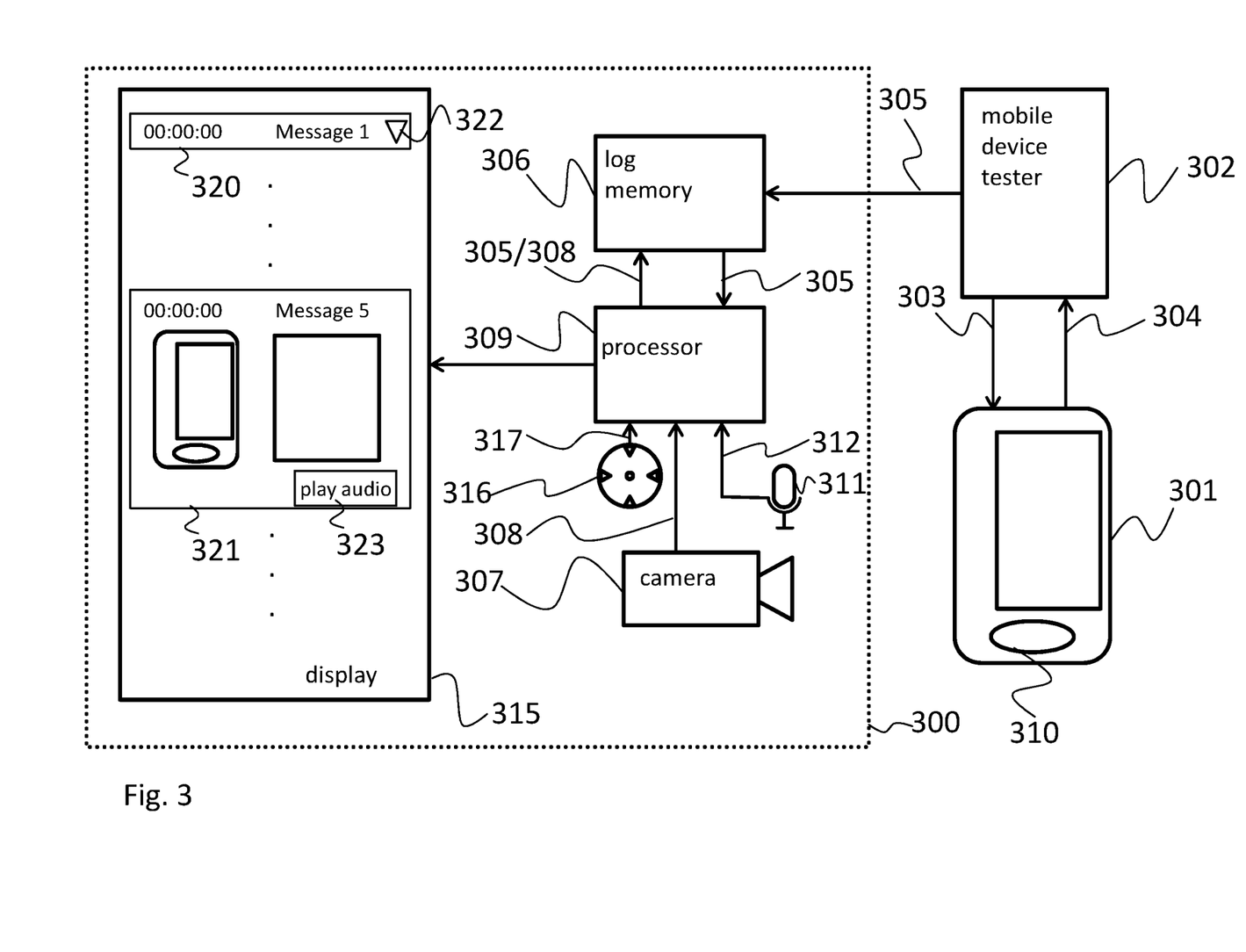
FIG. 3 shows a block diagram of another embodiment of a logging system according to an embodiment of the present invention.

FIG. 3 shows a block diagram of another embodiment of a logging system 300 according to an embodiment of the present invention.

The logging system 300 of FIG. 3 is based on the logging system of FIG. 1 and further comprises a microphone 311 and a GPS receiver 316. It is to be understood, that instead of a GPS receiver 316 any other positioning sensor can be used, either satellite based or for example based on iBeacons or the like.

As in FIG. 2 the microphone 311 records the audio 312, which the smartphones' 301 speaker 310 produces while the mobile device tester 302 provides the test signals 304 to the smartphone 301 and records any response messages 303 or measurement values from the smartphone 301. At the same time the camera 307 records a video 308 of the smartphone 301. In contrast to the camera 107 of FIG. 1 the camera 307 also records a video of the mobile device tester 302. Further, the GPS receiver 316 records the position of the smartphone 301 and provides according position information 317 to the processor 309, which synchronises all the data with the log 305.

The processor 309 is further capable of detecting specific events based on the video 308 and/or audio 312 and mark those events in the log. The processor can for example detect an incoming call, the answering of a call, any incoming message or any other event, which is announced by the smartphone 301 either via the smartphones' screen or speaker 310.

In FIG. 3 the display 315 shows a log of messages, where two messages 320, 321 are exemplarily shown. Every message 320, 321 comprises a time stamp, and the message content. Further, message 320 comprises an icon 322, which when clicked by a user expands the message to show the image of the smartphone 301 and the mobile device tester 302 at the respective point in time. The expanded version of a message is shown with message 321, which further comprises a button 323 to play the audio sequence, which was recorded around the respective point in time.

It is to be understood, that any combination of the features of FIGS. 1 to 3 is possible. The embodiments of FIGS. 1 and 3 can e.g. be freely combined with using the smartphones camera or microphone, as shown in FIG. 2. Further, any other combination of features is possible.

Figure 4:
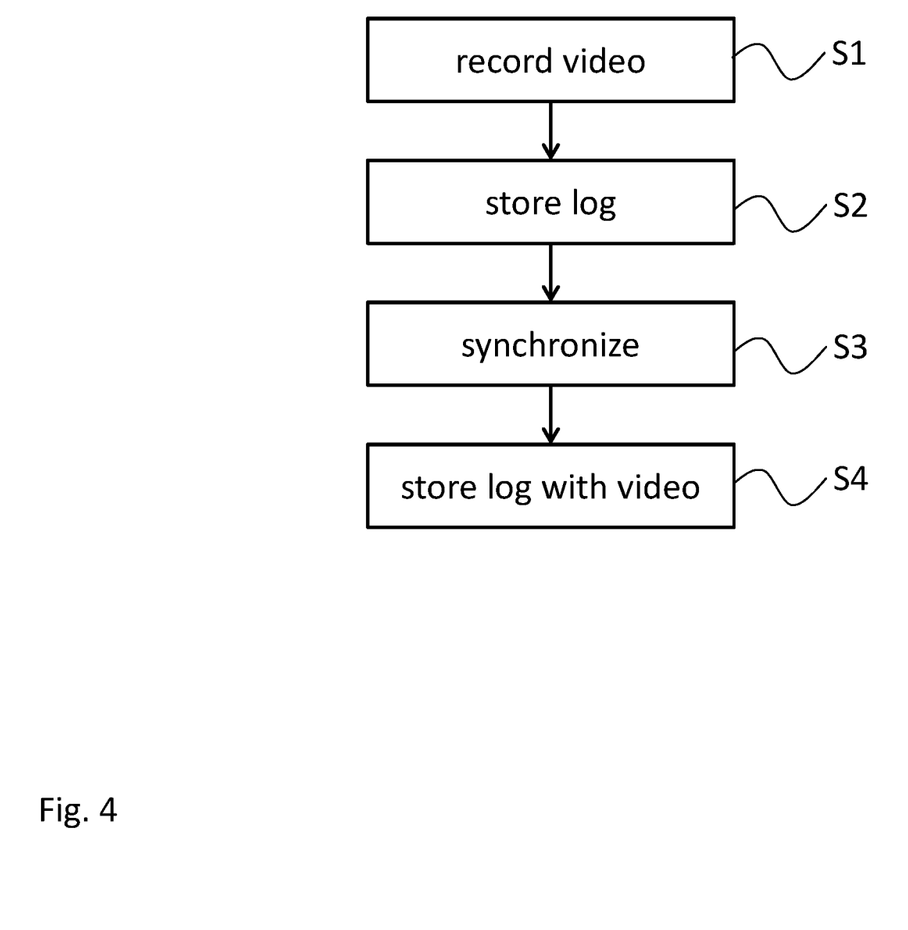
FIG. 4 shows a flow diagram of an embodiment of a method according to an embodiment of the present invention.

FIG. 4 shows a flow diagram of an embodiment of a method according to an embodiment of the present invention for logging tests of electronic devices 101, 201, 301 by at least one measurement and/or testing device 102, 202, 302.

The method comprises recording S1 a video 108, 208, 308 of the electronic device 101, 201, 301 under test while the test is performed on the electronic device 101, 201, 301 by the at least one measurement and/or testing device 102, 202, 302.

Further, a log 105, 205, 305 of the tests performed by the at least one measurement and/or testing device 102, 202, 302 on the electronic device 101, 201, 301 is stored S2.

The log 105, 205, 305 and the video 108, 208, 308 are then timely synchronized S3, and the log 105, 205, 305 is stored S4 together with the video 108, 208, 308 e.g. in a log memory.

The log 105, 205, 305 can further be displayed in a tabular form and for every log entry 320, 321 the respective video frame can be displayed in the table or a link to a respective video frame or video sequence can be displayed.

In one embodiment the video 108, 208, 308 is recorded with a camera 207 of the electronic device 101, 201, 301. For this at least one mirror 214 is positioned around the electronic device 101, 201, 301, such that the camera 207 can record the content of a screen of the electronic device 101, 201, 301.

Furthermore, an application on the electronic device 101, 201, 301, can record a respective video 108, 208, 308 together with specific time stamps.

Instead of using the camera 207 the video 108, 208, 308 can also be recorded by the electronic device 101, 201, 301, which performs screen capturing of its' screen. As a further alternative the video 108, 208, 308 can be recorded with a camera, which is external to the electronic device 101, 201, 301. Finally, the video 108, 208, 308 cannot only comprise a video of the electronic device 101, 201, 301, but also of the at least one measurement and/or testing device 102, 202, 302.

Especially for measuring the emissions of the electronic device 101, 201, 301, the electronic device 101, 201, 301 can be placed in a testing chamber 213, like an anechoic chamber 213. To keep the anechoic functions intact the video 108, 208, 308 can be recorded from the outside of a testing chamber 213.

To further enhance the information, which is collected while performing the test on the electronic device 101, 201, 301 an audio stream 212, 312 of sounds that are emitted by the electronic device 101, 201, 301 and/or the measurement and/or testing device 102, 202, 302 can be recorded, while the electronic device 101, 201, 301 is tested. It is to be understood that the log 105, 205, 305 of the tests can then be timely synchronised with the respective sections of the recorded audio stream 212, 312. In addition or as an alternative the position of the electronic device 101, 201, 301 can be determined via a satellite based positioning system 216 while the test is performed.

Finally, to improve the readability of the log 105, 205, 305 the recorded video 108, 208, 308 and/or audio 212, 312 can be analysed and predefined events in the log 105, 205, 305 can be marked.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A logging system for logging tests of electronic devices by at least one measurement and/or testing device, the logging system comprising:
   a first video recording unit, which records a video of the electronic device under test while the test is performed on the electronic device by the at least one measurement and/or testing device, wherein the first video recording unit comprises a camera;
   an audio recording device, which records an audio stream of sounds that are emitted by the electric device and/or the measurement and/or testing device, while the electronic device is tested;
   a log memory, which stores a log of the tests performed by the at least one measurement and/or testing device on the electronic device, wherein the log comprises at least one of log or test messages produced by the at least one measurement and/or testing device while the test is performed on the electronic device; and
   a processor, which timely synchronizes the log of the tests with the video recorded by the first video recording unit and stores the log with the video in the log memory,
   wherein every log or text message is provided with a time stamp and every frame of the recoded video is provided with a time stamp, and
   wherein the processor timely synchronizes the log of the tests with the respective sections of the recorded audio stream.

2. The logging system of claim 1, further comprising a display unit, which shows the log in a tabular form and for every log entry shows a respective video frame or video sequence in the table or a link to the respective video frame or video sequence.

3. The logging system of claim 1, wherein the first video recording unit is a camera of the electronic device, and at least one mirror is positioned around the electronic device, such that the camera can record the content of a screen of the electronic device.

4. The logging system of claim 3, wherein an application is provided on the electronic device, which records a respective video together with specific time stamps.

5. The logging system of claim 1, wherein the first video recording unit is the electronic device, which performs screen capturing of its screen.

6. The logging system of claim 1, wherein the first video recording unit is a camera, which is external to the electronic device.

7. The logging system of claim 1, wherein the first video recording unit further records a video of the at least one measurement and/or testing device.

8. The logging system of claim 1, comprising a second video recording unit, which records a video of the at least one measurement and/or testing device.

9. The logging system of claim 1, comprising a testing chamber, wherein the first video recording unit is provided on the outside of the testing chamber and records a video of the interior of the testing chamber.

10. The logging system of claim 9, wherein the testing chamber is an anechoic chamber and an opening hole is provided in an outer wall of the anechoic chamber, which is positioned between at least two reflection elements of the anechoic chamber.

11. The logging system of claim 10, wherein the first video recording device is positioned to record a video through the opening hole.

12. The logging system of claim 1, comprising a satellite based positioning system, which determines the position of the electronic device while the test is performed.

13. The logging system of claim 1, wherein the processor analyses the recorded video and marks predefined events in the log.

14. A method for logging tests of electronic devices by at least one measurement and/or testing device, the method comprising:
    recording a video of the electronic device under test while the test is performed on the electronic device by the at least one measurement and/or testing device, wherein the video is recorded by a camera;
    storing a log of the tests performed by the at least one measurement and/or testing device on the electronic device, wherein the log comprises at least one of log or test messages produced by the at least one measurement and/or testing device while the test is performed on the electronic device;
    timely synchronizing the log of the tests with the recorded video;
    storing the log with the video, wherein every log or text message is provided with a time stamp and every frame of the recoded video is provided with a time stamp; and
    recording an audio stream of sounds that are emitted by the electric device and/or the measurement and/or testing device, while the electronic device is tested;
    wherein the log of the tests is timely synchronised with the respective sections of the recorded audio stream.

15. The method of claim 14, further comprising displaying the log in a tabular form and for every log entry displaying the respective video frame in the table or a link to the respective video frame.

16. The method of claim 14, wherein the video is recorded with a camera of the electronic device, and at least one mirror is positioned around the electronic device, such that the camera can record the content of a screen of the electronic device, and especially wherein an application on the electronic device records a respective video together with specific time stamps.

17. The method of claim 14, wherein the video is recorded by the electronic device, which performs screen capturing of its screen; or wherein the video is recorded with a camera, which is external to the electronic device.

18. The method of claim 14, wherein a video of the at least one measurement and/or testing device is recorded.

19. The method of claim 14, wherein the video is recorded by a video recording unit on the outside of a testing chamber, especially an anechoic chamber.

20. The method of claim 14, comprising determining the position of the electronic device via a satellite based positioning system while the test is performed.

21. The method of claim 14, further comprising analysing the recorded video and marking predefined events in the log.

* * * * *